Jan. 16, 1968   J. B. DUNNINGTON   3,364,097
FIRE-RESISTANT PANEL SYSTEMS
Filed July 3, 1964
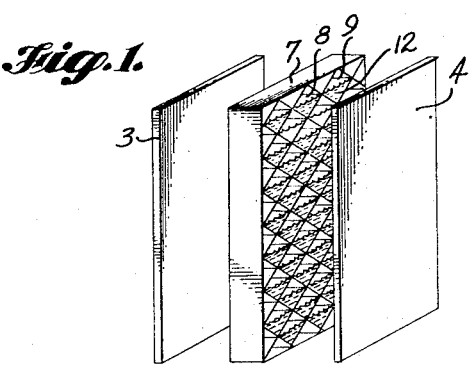
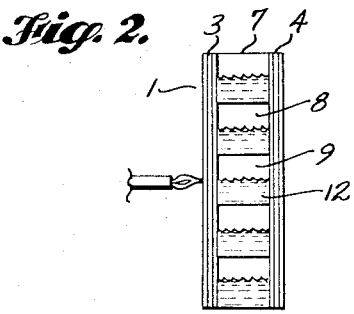
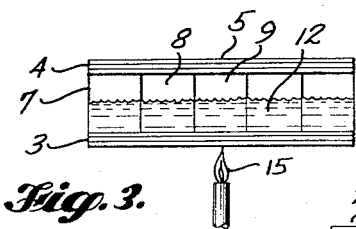
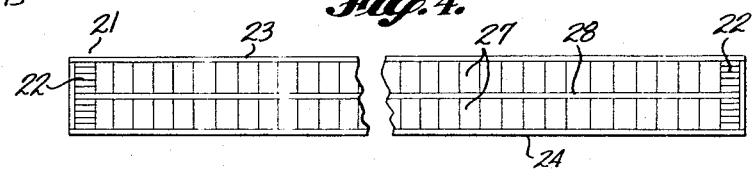
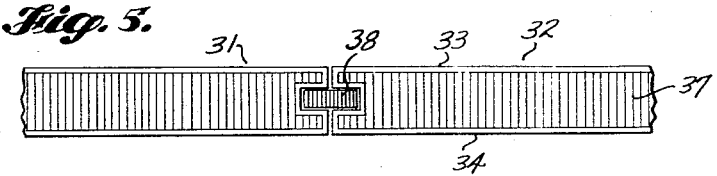
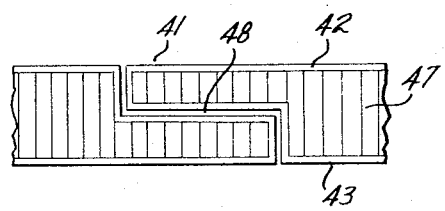
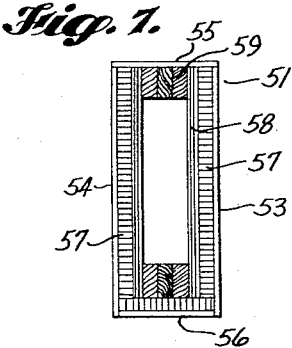
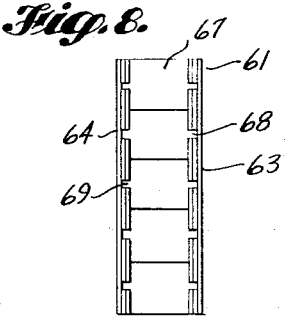
INVENTOR.
JON B. DUNNINGTON
BY
ATTORNEYS

United States Patent Office 3,364,097
Patented Jan. 16, 1968

3,364,097
FIRE-RESISTANT PANEL SYSTEMS
Jon B. Dunnington, Mercer Island, Wash., assignor to Weyerhaeuser Company, Tacoma, Wash., a corporation of Washington
Filed July 3, 1964, Ser. No. 380,149
8 Claims. (Cl. 161—69)

ABSTRACT OF THE DISCLOSURE

A fire-resistant panel with cellular pockets forming the core between the panel skins. An infill material having fire-retardant properties, such that it yields its water of hydration upon exposure to elevated temperatures, is contained and supported by the cellular pockets.

---

This invention relates to fire-rated building construction elements and particularly to light wood construction units which are protected in such a manner that they can be used in fire-rated applications.

Light wood construction units can be characterized as those consisting of two external face members with a core member interposed and secured between the faces to form a unitary structure of the three members. One general example of this construction is a unit composed of plywood face members with a cellular honeycomb core member. This structure is referred to as a honeycomb panel, such as the type shown in U.S. Patent No. 2,385,352.

A variety of methods and processes is known for making flameproof or fire-retardant wood products. In general, these methods are based upon impregnation of the wood or wood products with fireproofing agents such as inorganic salts and phosphorous and halogen derivatives, or coating such materials with non-combustible and intumescent paints to achieve fire-resistive properties. Products so treated provide short term protection under fire exposure due to the small amounts of retardant material added. Thus, they are ineffective and inefficient barriers and do not satisfy requirements for the length of time necessary to qualify for various fire-rated building units.

It is the object of this invention to increase the endurance of composite cellular sandwich panel constructions under fire conditions.

It is a further object of this invention to provide protection means which will allow light wood constructions to be used in fire-rated applications.

In the practice of this invention, the space enclosed by each cell of the honeycomb core of a sandwiched panel is utilized as a reservoir for fire retardant chemicals. The voids of the honeycomb are partially filled with granulated borax or a mixture of granulated borax and bark. Both the borax and the borax and bark mixture lose their water of hydration under fire conditions which cools the sandwich panel. The borax, and also the borax and bark mixture, expand and fuse under heat, forming a glass-like surface on the side subjected to the flame, and filling the void spaces to prevent the flame from penetrating to the interior surface of the unexposed panel. Other chemicals having similar characteristics such as organic salts and hydrates of the organic acids and their alkali salts could also be used as a fire-retardant core infill material.

Further objects and advantages of the invention will become more readily apparent from the following description and the annexed drawings. While the invention is susceptible to various modifications, and certain features may be used without the use of other features, certain illustrative panels have been shown in the drawings and will be described below in detail. It should be understood, however, that there is no intention to limit the invention to the specific forms disclosed. On the contrary, the intention is to cover all modifications, alternative constructions, equivalents, and uses falling within the spirit and scope of the invention as expressed in the appended claims.

In the drawings:

FIGURE 1 is an exploded perspective view of a panel unit having a honeycomb core made in accordance with the present invention;

FIGURE 2 is an end elevation view of a panel made in accordance with the present invention, being subjected in a vertical position to a flame test;

FIGURE 3 is a side elevation view of a panel made in accordance with this invention shown in the position required for a horizontal fire test;

FIGURE 4 is a plan view of a fire door constructed in accordance with this invention;

FIGURE 5 is a plan view of a partition panel system, made in accordance with this invention;

FIGURE 6 is a side elevation view of a roof deck system, made in accordance with this invention;

FIGURE 7 is an end elevation view of a fire-rated box beam system made in accordance with this invention; and FIGURE 8 is a side elevation view of a panel system modification, including relief holes in the interior surfaces of the face members.

With general reference to FIGURE 1, a novel sandwich panel 1 is shown in an exploded perspective view. It is comprised of two face members or skins 3 and 4 and a cellular core 7 having a high degree of void spaces, such as cells 8 and 9 which are used as the container, separator and supporting mechanism for the infill materials 12 which include fire-retardant chemicals. The space in the cellular core 7 is considered a reservoir space into which any beneficial chemical or combination of chemicals can be placed.

The two faces 3 and 4 are bonded to the core 7. Under fire conditions, the resulting composite sandwich panel 1 prevents penetration of the fire to the unexposed face member, for a period of time substantially greater than can be achieved with existing treated or untreated panel systems.

A sample of the structure shown in FIGURE 1 has been subjected to a typical fire-rating test. The core 7 in this sample was one inch thick, consisting of a cellular seventy-eight pound unimpregnated and untreated kraft paper honeycomb, having one inch cell size. The core 7 was bonded to a ¼" interior grade plywood face member 3. The honeycomb cells, such as 8 and 9, were filled with a mixture of borax and bark, in this case 80% granular borax and 20% bark which had been well mixed. The density of the mixture 12 was in the range of 40–45 pounds per cubic foot. The panel unit was then completed by bonding a second face member 4 of ¼" plywood to the core 7. When exposed to elevated temperatures, the core temperature increased slowly, preventing pyrolysis of the unexposed face member 4 for one and one-half hours, while the exposed face member 3 was maintained at a temperature between 1500° to 1800° F.

To be satisfactory, the face members 3 and 4, regardless of specific material, must assist the total assemblage 1 by providing a thermal insulation barrier during fire exposure. The exposed face member 3 should exclude an adequate supply of oxygen at the outset of exposure to reduce degradation. The exposed face member 3 should preferably allow the composite panel 1 to breath just prior to and during the dehydration, decomposition, and volatilization phases of the infill material 12.

The unexposed face member 4 must remain intact for the duration of the rated period. It must withstand forces created by fire exposure and a fire hose water stream as well as act as a thermal insulation barrier. The face members 3 and 4 and must also perform the functions of structural skins under normal conditions. These requirements are satisfied by cement-asbestos board or plywood, but not to the exclusion of other facing materials meeting these general requirements.

The cellular core material 7 must remain attached to the inside surface of the unexposed face member 4 during the fire-rated life of the panel assembly 1. The core must contain, hold and support the infill material 12 under fire exposure conditions. It must also provide for discontinuity to avoid cracking and assembly warpage. The core 7 must also perform the functions of a structural core under normal conditions. These requirements are satisfied by both treated and untreated corrugated and cellular paper honeycomb cores.

A satisfactory infill material 12 may include chemicals or combinations of chemicals which undergo endothermic reaction at elevated temperatures to act as an absorbers of thermal energy. This material should decompose in order to absorb thermal energy and form volatile gases which aid in dissipating the heat. The material should also act as a thermal insulator during exposure to thermal stress without shrinking when heated or flowing away in molten form. Under normal conditions, the infill material 12 must be physically and chemically stable. These requirements are satisfied by the hydrated salts such as borax (sodium tertaborate decahydrate) and carboxylic acids and their salts which generate carbon dioxide during thermal decomposition.

Referring now to FIGURE 2, there is shown, in schematic form, a composite panel 1 as it would be positioned for a vertical test for fire-rating. As shown the face member 3 is subjected to a flame 15 and the core 7 comprises cells such as 8 and 9 which may contain infill material 12 to protect the unexposed face member 4 from the effects of the flame 15.

Referring now to FIGURE 3, a schematic representation of a panel undergoing a horizontal flame test is shown. In a similar manner to that shown in FIGURE 2, the flame 15 is held in contact with the exposed face member 3 and the core 7, consisting of cells such as 8 and 9, contains fire-retardant infill material 12 to protect the unexposed face member 4 from the effects of the flame 15.

Several tests have been made on the panel assemblage with variations in the face members, the core member and the type and quantity of the infill material. Table A is presented to show the results achieved by panels D, E, F, G, and H in the vertical test as shown in FIGURE 2 and by panels A, B, and C in the horizontal test as shown in FIGURE 3. It should be noted that the flame 15 in both the horizontal and vertical tests presents a temperature at the exposed surface of the exposed skin member 3 between 1500 and 1800° F. The remaining panels, I through U, were subjected to the ASTM E119 Time-Temperature Fire Exposure Test.

While the exact volume of infill material is not critical, if there is too little the infill material is unable to absorb sufficient heat to keep the panel from being consumed and if there is too much infill material, it will expand beyond the limits of the honeycomb and the panel will erupt. A reasonable range for filling the cells is between 50 and 90% by volume.

The following table illustrates the efficacy of the invention.

TABLE A

| Panel | Skin Members | Core Structure | Infill Material | Test Results |
|---|---|---|---|---|
| A | ¼″ plywood | Untreated paper honeycomb with 1″ cell size. | None | In Horizontal test: Point 5 reached 250° F. in 18.5 minutes and 412° F. in 32 minutes at test end. |
| B | ----do---- | ----do---- | Each core cell ½ filled with polyvinyl alcohol (gel form 90-95% H₂O). | In Horizontal test: Point 5 reached 180° F. in 30 minutes and maintained that temperature up to 90 minutes reaching 193° F. after 120 minutes at test end. |
| C | ¼″ plywood with a 1/16″ deep hole in both interior surfaces opposite each cell and with aluminum foil separating each skin from the core. | ----do---- | ----do---- | In Horizontal test: Point 5 reached 170° F. in 30 minutes, 180° F. in 40 minutes maintaining that temperature up to 90 minutes reaching 186° F. after 120 minutes at end of test. |
| D | ¼″ plywood | ----do---- | None | In Vertical test: Point 5 reached 250° F. in 14 minutes and 313° F. in 18 minutes at end of test. |
| E | Exposed member 3: ¼″ plywood with a 1/16″ deep hole in its interior surface opposite each cell. Unexposed member 4: ¼″ plywood. | ----do---- | Each core cell ½ filled with polyvinyl alcohol (gel form 90-95% H₂O). | In Vertical test: Point 5 reached 135° F. in 30 minutes, 140° F. in 60 minutes, 170° F. in 90 minutes, 200° F. in 120 minutes. |
| F | ----do---- | ----do---- | Each core cell ½ filled with mixture of 50% polyvinyl alcohol (gel form with 90-95% H₂O) and 50% bark (by volume). | In Vertical test: Point 5 reached 135° F. in 30 minutes, 135° F. in 50 minutes, 211° F. in 60 minutes, 212° F. in 75 minutes, 350° F. in 79 minutes. |
| G | ----do---- | ----do---- | Each core cell ¾ filled with borax (sodium tetraborate decahydrate). | In Vertical test: Point 5 reached 145° F. in 30 minutes, 150° F. in 60 minutes, 200° F. in 90 minutes, 250° F. in 120 minutes. |
| H | ----do---- | ----do---- | Each core cell ¾ filled with a mixture of 50% borax and 50% bark (by volume). | In Vertical test: Point 5 reached 140° F. in 30 minutes, 145° F. in 60 minutes, 150° F. in 90 minutes, 170° F. in 120 minutes, 200° F. in 240 minutes. |
| I | ----do---- | ----do---- | Each core cell filled with a mixture of borax and bark in a 2½:1 ratio (by volume). | ASTM E119 Test: Unexposed exterior face reached 130° F. in 30 minutes, 155° F. in 60 minutes, 180° F. in 86 minutes, at end of test. |
| J | ----do---- | ----do---- | Each core cell filled with a mixture of borax and bark in a 3:1 ratio (by volume). | ASTM E119 Test: Unexposed exterior face reached 120° F. in 30 minutes, 160° F. in 60 minutes, 190° F. in 90 minutes. |
| K | ¼″ plywood | 1⅛″ block | Fire-retardant polystyrene | ASTM E119 Test: Unexposed exterior face reached 250° F. in 9 minutes, burned through in 9.25 minutes. |
| L | ----do---- | 1⅛″ paper honeycomb, 11% impregnation, ¾″ cell size. | None | ASTM E119 Test: Unexposed exterior face reached 250° F. in 14.5 minutes. |
| M | ----do---- | 1⅛″ block | Fire-retardant treated particle board (sold under the trademark "RODDIS B-Label"). | ASTM E119 Test: Unexposed exterior face reached 250° F. in 56 minutes, burned through in 45 minutes. |
| N | ----do---- | ----do---- | Calcium silicate | ASTM E119 Test: Unexposed exterior face reached 250° F. in 57 minutes, burned through in 86 minutes. |

TABLE A—Continued

| Panel | Skin Members | Core Structure | Infill Material | Test Results |
|---|---|---|---|---|
| O | ___do___ | 1⅛″ thick paper honeycomb, 11% impregnation, ¾″ cell size. | Each cell filled with a mixture of 80% borax, 18% bark and 2% CaCO₃. | ASTM E119 Test: Unexposed exterior face reached 250° F. in 63.5 minutes, burned through in 66 minutes. |
| P | ___do___ | ___do___ | Each cell filled with a mixture of 60% borax and 40% bark. | ASTM E119 Test: Unexposed exterior face reached 250° F. in 73.5 minutes, burned through in 75 minutes. |
| Q | Members 3 and 4 both 0.032 in aluminum sheet. Unexposed member 4 had vent holes 1/16″ dia. in a 1″ grid pattern. | ___do___ | Each cell filled with a mixture of 80% borax (decahydrate) and 20% bark. | ASTM E119 Test: Unexposed exterior face reached 250° F. in 82.5 minutes, burned through in 87 minutes. |
| R | Members 3 and 4 both ¼″ cement-asbestos board. Unexposed member 4 had vent holes 1/16″ dia. in a 1″ grid pattern. | ___do___ | ___do___ | ASTM E119 Test: Unexposed exterior face reached 250° F. in 86 minutes. |
| S | ⅜″ gypsum board | ___do___ | Each cell filled with a mixture of 80% borax, 18% bark and 2% CaCO₃. | ASTM E119 Test: Unexposed exterior face reached 250° F. in 92.5 minutes, burned through in 100 minutes. |
| T | 0.032 in aluminum sheet | 1⅛″ block | Fire-retardant polystyrene | ASTM E119 Test: Unexposed exterior face reached 250° F. in 5.5 minutes, burned through in 6 minutes. |
| U | Kraft paper | Untreated paper honeycomb | Each cell filled with a mixture of 75% borax, 25% bark. | ASTM E119 Test: Unexposed exterior face burned through in 60 minutes. |

From Table A, it is clear from the test results for panel A, that a honeycomb panel unit with plywood skin members and without infill material in the cells of the honeycomb is quite unsatisfactory in the horizontal test since the unexposed face member reaches 412° F. in about one-half hour's time. However, in a similar horizontal test using polyvinyl alcohol in gel form in panels B and C with a similar skin and core structure, the point 5 on the unexposed face member 4 reached only 180° F. in one-half hour's time maintaining approximately that temperature for over an hour and one-half providing adequate fire-rated protection.

In the vertical test, as shown in FIGURE 2, panel D, being a hollow honeycomb panel structure, was wholly unsatisfactory after an exposure of a mere 18 minutes to the flame. However, panel E, being half filled with polyvinyl alcohol in gel form, provided excellent protection for well over ninety minutes in a similar test. Similarly, good results were observed with panels F, G, H, I and J.

Other panels, such as panel K, containing other fire-retardant materials between the plywood skins, showed ever poorer results than an empty honeycomb panel. The results with panel L indicate that treating the honeycomb with a fire-retardant impregnation provides little additional protection to the panel structure. Somewhat more satisfactory results were obtained by use of fire-retardant impregnated particle board as shown in panel M which gave satisfactory results up to 45 minutes' exposure. A slightly better performance than this was provided by using a solid block of calcium silicate in panel N.

Honeycomb panels with various quantities and mixtures of borax and bark are shown to give excellent results in panels O, P, Q, R, and S. Even panel U, with kraft paper face members, provided nearly one hour of satisfactory service when the honeycomb core material was filled with a mixture of borax and bark. This is in striking contrast to panel T which utilizes aluminum sheet face members and a solid block of fire-retardant polystyrene which completely failed after a mere 6 minute exposure to the ASTM E119 test.

Thus it is seen that the utilization of the honeycomb core material as a container for fire-retardant infill chemicals provides sufficient protection for plywood sandwich panels to withstand exposure to fire for extended periods of time.

Variations in the use of the concept of fire-rated panels may be utilized for other construction units such as a fire door shown in FIGURE 4. The door 21 is constructed from fire-retardant styles 22, exterior face members 23 and 24, which may be ⅛ inch plywood, a sandwich core 27 interposed between the two exterior face members, and an interior structural member 28 may be provided for additional strength.

FIGURE 5 shows a section view of a joint between two partitioned panels 31 and 32, which have exterior face members 33 and 34, which may be quarter-inch plywood, and a sandwich core 37 interposed between the two skin members. The partitioned panels 31 and 32 may be joined by a non-combustible spline member 38 to result in a unified structure, performing various partition system functions.

In FIGURE 6, there is shown a section view of a roof deck 41 comprising structural skin members 42 and 43, a sandwich core 47 interposed between the skin members and a protected joint 48 positioned wherever structural support is needed.

In FIGURE 7, there is an end view of a fire-rated box beam 51 having exterior plywood skin members 53, 54, 55 and 56 separated by a sandwich core 57 from plywood web members 58 and flange members 59.

FIGURE 8 discloses a modified panel component 61 having exterior skin members 63 and 64 separated by sandwich core 67. The interior surfaces of skin members 63 and 64 are grooved in areas opposite each cell of the sandwich core 67 to provide vents, such as 68 and 69, for the escaping gases from the cells produced by the infill material 12 when it is subjected to elevated temperatures.

A number of inorganic hydrates, carbonates, and decarboxylating organic acids and their salts have been considered as possible materials to use either alone or in combination with borax to fill fire-resistant honeycomb cores. The results are given in Table A. It has been found that many combinations of chemicals and bark will perform well for sixty minutes, but few will survive for ninety minutes. In general, for filling honeycomb cells, granulated bark (25–15%) and borax (75–85%) appear to be the best basic combination to obtain reproducible ninety-minute panel tests. The bark fraction can of course be replaced by wood fragments including sander flour.

Although there is an increase in panel life as the borax content increases, there is a practical limit between 85% and 92% where the pressure build-up within the core causes the borax to erupt, causing voids in the core which allow the flame to fall directly onto the otherwise unexposed face member. A certain minimum porosity seems necessary; bark provides this, as well as providing a solid carbon support for the molten borax at high temperatures. The operating principles of the panel construction herein disclosed are not fully understood, but from my observations, they may be best described by the relation of the events which take place during the test for panel fire-resistant life. While this description seems the most likely one, I do not wish to be bound or limited by it. When the flame impinges on the wood face, charring and combustion occur. Within three to eight minutes, the char cracks and the flame from the burning exposed skin member 3 is extinguished. This occurs through the cooling effect of the water of dehydration and the dilution of the combustible products. The charred flame-face 3 then becomes a thermal insulator between the core and the flame. However, the char soon becomes red hot and air oxidation may occur. At this point the heat value of the carbonized wood actually adds fuel to the fire. When the core reaches about 70° C., dehydration of the borax begins to occur. The water from this dissolves some of the borax, forming a hot concentrated solution which impregnates and fireproofs the lignocellulosic faction of the core as well as the interior faces of the veneer.

As the temperatures rise, dehydration of the borax, and the drying of the soaked cellulosic materials absorbs considerable thermal energy. Once the core temperature reaches about 300° C., the core becomes a thermal insulator like an asbestos sheet, since it remains intact as a continuous non-eroding flame barrier. At this stage approximately 60% of the useful thermal absorption capacity of the core is exhausted. During the first stage of dehydration and again when the salt becomes molten, there is considerable mobility in the wood faces and the core materials become coated with this fireproofing chemical which keeps air from the combustible portions of the panel. If no oxygen can reach the char, no utilization of this potential fuel value will be made.

The thermal absorption effect is obtained by the additive effect of several factors. The faces or skins seem to contribute amounts up to 15% or more of the heat-absorbing capacity of the total panel system. By using other face materials such as cement asbestos or combinations of materials, such as veneers or plywoods and cement asbestos boards or sheets, the percentage of heat absorption of the total panel contributed by the faces can be increased.

The infill core materials 12 seem to contribute amounts up to 85% of the heat absorbing capacity of the total panel. This 85% is broken down into the following ways:

First, the decomposition of the combination of chemicals and absorption of heat by the volatile decomposition products, which in the case of the sodium tetraborate decahydrate apparently amounts to 55% of the total heat absorbing capacity of the core. This step is in itself composed of two major parts, which are the endothermic reaction of dehydration and the absorption of heat by water.

Second, the absorption of the heat by the water of dehydration and by the volatile products formed from charring of the wood or bark fraction which is about 25% of that contributed by the core.

Third, the heat absorbed by the combination of dehydrated salt and the remaining char which is approximately 15% of the heat absorbing capacity of the core.

The above percentages are stated as approximate values and are not exact for any specific combination of skins, core or infill materials.

Having now described my invention and in what manner the same may be used, what I claim as new and desire to protect by Letters Patent is:

1. A fire-resistant construction unit comprising in combination:
 a pair of confining skin means,
 a core means secured to and spaced between said skin means,
 said core means embodying a plurality of cellular pocket means,
 infill materials having fire-retardant properties, such that they will yield their water of dehydration upon exposure to elevated temperatures, being contained and supported by said core cell pocket means.

2. The construction unit of claim 1 wherein:
 said core cell pocket means are filled between 50 and 90% of their volume by said infill materials.

3. The construction unit of claim 1 wherein:
 said infill material is polyvinyl alcohol in gel form.

4. The construction unit of claim 1 wherein:
 said infill material is borax.

5. The construction unit of claim 1 wherein:
 said infill material is a mixture of borax and bark.

6. The construction unit of claim 1 wherein:
 said infill material is a mixture of from 75 to 85% borax and from 25 to 15% granulated bark, by volume.

7. A fire-resistant construction system comprising in combination:
 first skin means having interior and exterior faces;
 second skin means having interior and exterior surfaces and being displaced spacially from said first skin means;
 core means spanning the distance between said first and second skin means and having structural components defining cellular pockets secured to both of said interior surfaces;
 infill materials having fire-retardant properties, such that they will yield their water of dehydration upon exposure to elevated temperatures, being contained, supported and separated by said core cell pockets.

8. A fire-resistant construction unit comprising in combination:
 a pair of plywood skin members,
 a core member secured to and spaced between said skin members,
 said core member being constructed of paper honeycomb which defines a plurality of cellular pocket means,
 each of said cellular pocket means being filled from 50 to 90%, by volume, by an infill material,
 said infill material being a mixture of from 75 to 85% borax and from 25 to 15% bark, by volume,
 said infill material being contained, supported and separated by said pocket means.

References Cited

UNITED STATES PATENTS

| 2,690,100 | 9/1954 | McGarvey | 161—403 X |
| 3,043,730 | 7/1962 | Adie | 161—123 X |
| 3,210,147 | 10/1965 | Johnson et al. | 117—136 X |
| 2,385,352 | 9/1945 | Davis | 156—156 |
| 3,114,840 | 12/1963 | Johnston | 161—87 X |

FOREIGN PATENTS

| 501,768 | 4/1954 | Canada. |
| 543,740 | 7/1957 | Canada. |

EARL M. BERGERT, *Primary Examiner.*

H. F. EPSTEIN, *Assistant Examiner.*

UNITED STATES PATENT OFFICE
CERTIFICATE OF CORRECTION

Patent No. 3,364,097  January 16, 1968

Jon B. Dunnington

It is certified that error appears in the above identified patent and that said Letters Patent are hereby corrected as shown below:

Column 2, line 39, "faces 3 and 4" should read -- faces, 3 and 4 --; line 50, "bounded" should read -- bonded --. Column 3, line 22, "absorbers" should read -- absorber --. Column 7, line 7, "dehydration" should read -- hydration --; line 52, "dehy-" should read -- hy- --; line 63, "as" should read -- is --. Column 8, lines 6 and 33, "dehydration", each occurrence, should read -- hydration --.

Signed and sealed this 5th day of August 1969.

(SEAL)
Attest:

Edward M. Fletcher, Jr.
Attesting Officer

WILLIAM E. SCHUYLER, JR.
Commissioner of Patents